US012169081B2

(12) United States Patent
Alban et al.

(10) Patent No.: US 12,169,081 B2
(45) Date of Patent: Dec. 17, 2024

(54) INTEGRATED EXPANDER AND MOTOR-COMPRESSOR ASSEMBLY AND CLOSED LOOP COOLING CIRCUIT COMPRISING SUCH AN ASSEMBLY

(71) Applicant: Thermodyn SAS, Le Creusot (FR)

(72) Inventors: Thomas Alban, Le Creusot (FR); Benjamin Defoy, Le Creusot (FR); Pascal Gaudez, Le Creusot (FR)

(73) Assignee: Thermodyn SAS, Le Creusot (FR)

( * ) Notice: Subject to any disclaimer, the term of this patent is extended or adjusted under 35 U.S.C. 154(b) by 138 days.

(21) Appl. No.: 17/758,556

(22) PCT Filed: Jan. 8, 2021

(86) PCT No.: PCT/EP2021/025004
§ 371 (c)(1),
(2) Date: Jul. 8, 2022

(87) PCT Pub. No.: WO2021/144144
PCT Pub. Date: Jul. 22, 2021

(65) Prior Publication Data
US 2023/0037800 A1 Feb. 9, 2023

(30) Foreign Application Priority Data
Jan. 15, 2020 (FR) ..................... 2000382

(51) Int. Cl.
| F25B 11/04 | (2006.01) |
| F04D 25/06 | (2006.01) |
| F04D 29/057 | (2006.01) |
| F04D 29/058 | (2006.01) |
(Continued)

(52) U.S. Cl.
CPC .............. *F25B 11/04* (2013.01); *F04D 25/06* (2013.01); *F04D 29/057* (2013.01); *F04D 29/058* (2013.01); *F25B 1/053* (2013.01); *F25B 31/026* (2013.01)

(58) Field of Classification Search
CPC .. F25B 11/04; F25B 1/053; F25B 1/10; F25B 31/026; F25B 31/006; F25B 2400/072; F25B 2400/14; F04D 25/06; F04D 25/024; F04D 25/04; F04D 29/057; F04D 29/058; F04D 29/051; F04D 29/584; F04D 17/122; F25J 1/0025; F25J 1/0204; F25J 1/0279; F25J 1/0284; F25J 1/005; F25J 1/0277;
(Continued)

(56) References Cited

U.S. PATENT DOCUMENTS

| 4,477,223 A | 10/1984 | Giroux |
| 2013/0091869 A1 | 4/2013 | Bardon et al. |
| 2019/0041124 A1* | 2/2019 | Berti ............ F25J 1/0288 |

FOREIGN PATENT DOCUMENTS

| EP | 3426994 A1 | 1/2019 |
| JP | 2005098604 A | 4/2005 |

* cited by examiner

*Primary Examiner* — Emmanuel E Duke
(74) *Attorney, Agent, or Firm* — Paul Frank + Collins P.C.

(57) ABSTRACT

The integrated expander and motor-compressor assembly comprises a compression section mounted between the two radial bearings on a trans-mission shaft, an expander cantilevered at a free end of the transmission shaft, a gas diffuser and a duct between the expander and a first radial bearing, the first radial bearing been the closest radial bearing to the expander. The gas diffuser diffuses a gas barrier which is sucked up by the duct.

10 Claims, 2 Drawing Sheets

(51) Int. Cl.
*F25B 1/053* (2006.01)
*F25B 31/02* (2006.01)

(58) Field of Classification Search
CPC ...... F25J 1/0288; F25J 2230/20; F01D 25/16; F01D 15/005; F02C 1/04
See application file for complete search history.

INTEGRATED EXPANDER AND MOTOR-COMPRESSOR ASSEMBLY AND CLOSED LOOP COOLING CIRCUIT COMPRISING SUCH AN ASSEMBLY

FIELD OF THE INVENTION

The present invention relates to an integrated expander and motor-compressor assembly and relates in particular to a specific arrangement of such an assembly.

DESCRIPTION OF RELATED ART

Document EP3426994 discloses an expander and motor compressor unit comprising an electric motor mounted on a drive shaft, an expander positioned in a cantilever configuration on the first shaft and separated from the electric motor by a partition wall, a compressor mounted on a driven shaft and a flexible coupling device connecting both shafts.

Each shaft is supported by two radial bearings, for example magnetic bearings.

In operation, the power generated by the gas expanded in the expander is partly recovered as compression work by the compressor. The electric motor supplies the compressor with additional mechanical power.

Further, the unit comprises a fluid connection between one of the most downstream compressor stages and a sealing arrangement positioned around the first shaft located in the partition wall so that buffering gas is delivered by the compressor to the sealing arrangement to avoid that the cooled expanded gas migrates to and damages the bearings and the electric motor.

However, in case of a breakdown of the flexible coupling device, the compressor is not feed with mechanical power. As a result, no compressed gas is delivered to the sealing arrangement and the cooled expanded gas migrates to and damages the bearings and the electric motor.

Further, as the expander is on the same shaft as the electric motor, the power generated by the gas expansion is not used so that the speed of the driven shaft increases and damage the assembly. An overspeed control system is needed to control the speed of the expander.

When the expander and motor compressor unit does not comprise a flexible coupling device, the expander, the electric motor and the compressor are mounted on a common shaft.

As a result, the dynamic behavior of the common shaft is degraded compared to the first and second shafts embodiment connected with the flexible coupling device.

Document US 2013/0091869 discloses a compressor-expander comprising an expander positioned in a cantilever configuration on a central shaft, and a multi-stage compressor supported on the central shaft between two bearings.

In operation, the gas is expanded in the expander and the power generated by the gas expansion is partly recovered as compression work by the compressor.

The free end of the central shaft is connected to a device adapted to supply additional rotational power to the central shaft.

However, the lower pressure stage of the compressor is located on the expander side.

Accordingly, the cooled expanded gas may migrate to and damage the bearings.

Further, as the device is mechanically connected to the compressor-expander, the resulting shaft comprising the central shaft and the device shaft is longer than the central shaft. As a result, the dynamic behavior of the resulting shaft is degraded compared to an arrangement using two shafts connected with a flexible coupling device.

The disclosed expander and motor compressor unit and the disclosed compressor-expander comprise axial thrust bearings to compensate for the thrust generated by the differential pressure applied on the compressor wheels.

Generally, an axial thrust bearing comprises a disk mounted on a shaft and a coil arranged on each side of the disk, each shaft comprising at least one axial thrust bearing.

This arrangement is voluminous and needs a larger shaft, a part of the shaft being used to fasten the disk thereon and to mount the coils.

The dynamic behavior of the shaft is therefore degraded.

There is a need to avoid at least some of the previously-mentioned drawbacks, especially by reducing the length of the shafts and by avoiding that cooled expanded gas damage the components inside the casing of the assembly in case of breakdown.

SUMMARY

According to an aspect, a new integrated expander and motor-compressor assembly is proposed.

The new integrated expander and motor-compressor assembly includes:
one housing;
at least two transmission shafts, each supported in the housing by at least two radial bearings;
a flexible coupling device connecting the transmission shafts;
an electric motor mounted on a first transmission shaft;
an expander cantilevered at a free end of a second transmission shaft; and
at least one compression section mounted between the two radial bearings on the second transmission shaft and having a high pressure part and a low pressure part fluidly coupled to the high pressure part so that a gas coming out of the low pressure part is compressed in the high pressure part.

The assembly includes a gas diffuser between the expander and a first radial bearing of the second transmission shaft, the first bearing being the closest bearing to the expander.

The assembly also includes a first duct connected between the gas diffuser and the first radial bearing and connected to an inlet of the low pressure part.

The gas diffuser is configured to diffuse gas directed to the expander and to the first radial bearing.

In operation, the gas diffuser may be fed with a part of the gas entering the high pressure part, and the first duct is configured to draw up a part of the diffused gas.

The high pressure part may be mounted between the expander and the low pressure part on the second the second transmission shaft.

In a first embodiment, the at least one compression section may include at least one compression wheel and a second balancing piston to compensate a differential pressure acting on the at least one compression wheel.

In a second embodiment, the at least one compression section may include two half-compression sections comprising each at least one compression wheel and arranged so that, during the rotation of the second transmission shaft, the thrust generated by the at least one compression wheel of a first half-section compensates for the thrust generated by the at least one compression wheel of the second half-compression section.

A second balancing piston may be arranged between the two half-compression sections to compensate a differential pressure acting on the at least one compression wheel of the first and second half-sections.

Advantageously, the expander and motor-compressor assembly comprises at least two thrust bearings.

A first thrust bearing of the at least two thrust bearings is mounted on the first transmission shaft of the at least two transmission shafts and a second thrust bearing of the at least two thrust bearings being mounted on the second transmission shaft of the at least two transmission shafts.

The thrust bearings may include active magnetic bearings or gas bearings.

Advantageously, each thrust bearing includes a first half-thrust bearing and a second half-thrust bearing.

The first half-thrust bearing and the second half-thrust bearing of the first thrust bearing are arranged at each side of the electric motor to frame the radial bearings of the first transmission shaft and the first half-thrust bearing and the second half-thrust bearing of the second thrust bearing being arranged between the gas diffuser and the flexible coupling to frame the radial bearings of the second transmission shaft.

The first half-thrust bearings are configured to compensate a thrust generated by the at least one compression wheel of the at least one compression section on the first and second transmission shafts in a first axial direction; and the second half-thrust bearings are configured to compensate a thrust generated by the at least one compression wheel of the at least one compression section on the first and second transmission shafts in a second axial direction opposite to the first axial direction.

Each magnetic half-thrust bearing includes a shoulder in the first or second transmission shaft and a coil located before and proximate the shoulder.

The first or second transmission shaft passes through the coil.

The expander and motor-compressor assembly may include a first balancing piston positioned along the second transmission shaft of the at least two transmission shaft and configured to compensate a differential pressure acting on the expander.

The expander includes at least a second duct.

The first balancing piston includes at least a third duct, such that both ducts are configured to cooperate together to evacuate the gas diffused by the gas diffuser to an outlet of the expander.

According to another aspect, a closed loop cooling circuit is proposed

The circuit may include an expander and motor-compressor assembly as defined above and at least three heat exchangers.

A first heat exchanger of the at least three heat exchangers is coupled with a gas outlet of the low pressure part and a gas inlet of the high pressure part.

A second heat exchanger of the at least three heat exchangers is coupled with a gas outlet of the high pressure part and a gas inlet of the expander.

A third heat exchanger of the at least three heat exchangers is coupled with a gas outlet of the expander and the gas inlet of the high pressure part.

The first and second heat exchangers are configured to cool the gas flowing through the first and second heat exchangers and the third heat exchanger is configured to heat the gas flowing through the third heat exchanger.

BRIEF DESCRIPTION OF THE DRAWINGS

Other advantages and features of the invention will appear on examination of the detailed description of embodiments, in no way restrictive, and the appended drawings in which.

DETAILED DESCRIPTION

Embodiments herein discloses arrangements of at least one compression section of an expander and motor-compressor assembly preventing cooled expanded gas from damaging components, such as bearings and/or an electric motor, that are located within the housing.

Furthermore, the electric motor is mounted on a first transmission shaft, and the at least one compression section and the expander are mounted on a second transmission shaft.

A flexible coupling device connects both transmission shafts separating the bending modes of the transmission shafts.

If the flexible coupling fails, the expander will continue to drive the compression section until the second transmission shaft stops rotating, so that the compression section still delivers a gas barrier.

This gas barrier prevents cooled expanded gas from damaging components, such as bearings and/or an electric motor, that are located within the housing. In addition, each magnetic thrust bearing includes a first and a second half-thrust bearings comprising each a shoulder of a transmission shaft and a coil suppressing the disk mounted on the shaft and reducing the part of the shaft needed to mount the thrust bearing on the shaft.

Figure 1:
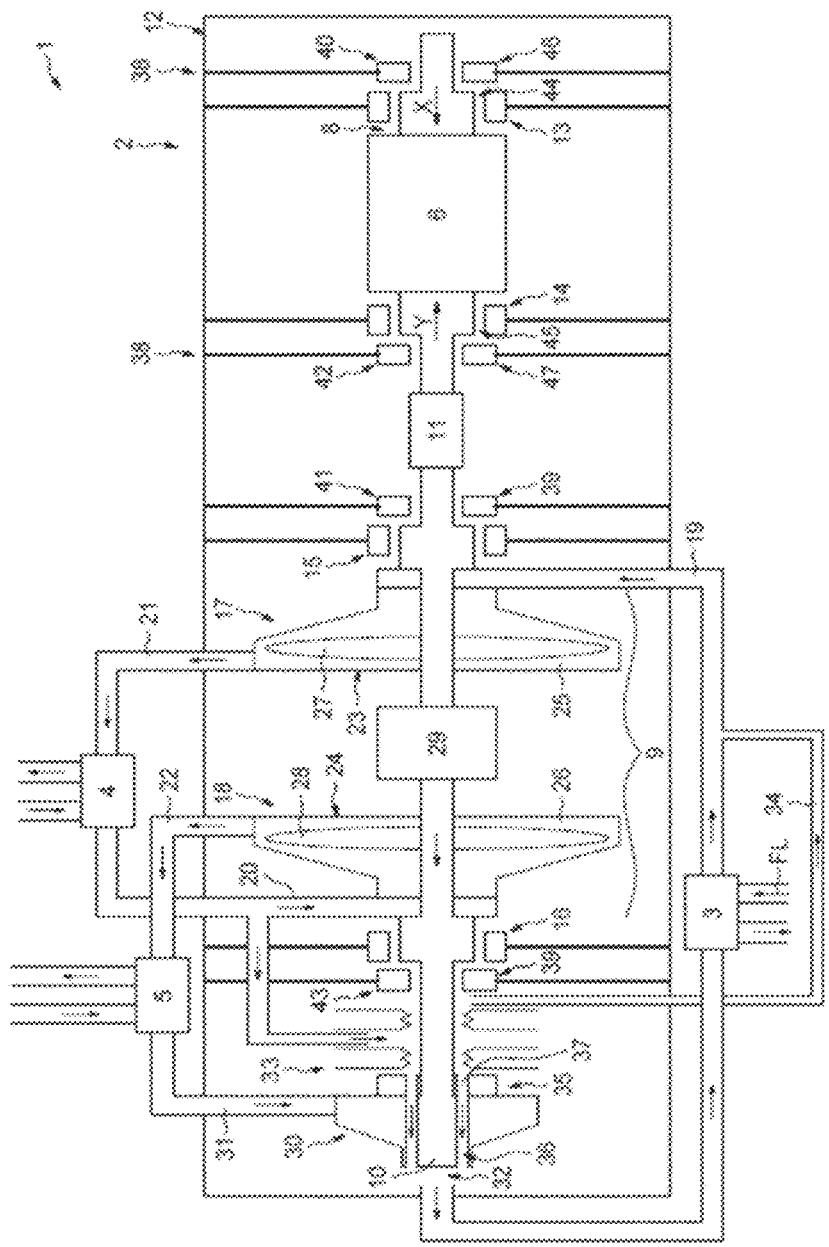
FIG. 1 represents an embodiment of a cooling circuit.

Reference is made to FIG. 1 which represents a first embodiment of an integrated expander and motor-compressor assembly 2 and three heat exchangers 3, 4 and 5 forming a closed loop cooling circuit 1.

The cooling circuit is configured to cool a fluid "FL" that circulates for example in a first heat exchanger 3.

In another embodiment, the cooling circuit 1 may include more or less than three heat exchangers.

The integrated expander and motor-compressor assembly 2 may include an electric motor 6 rotating a first shaft 8 (or drive shaft), at least one compression section 9 mounted on a second shaft 10 (or driven shaft) coupled to the first shaft by a flexible coupling device 11 and a sealed housing 12. Each shaft 8, 10 is supported in the housing 12 by two radial bearings 13, 14, 15, 16, such as gas radial bearings, or preferably magnetic radial bearings.

The flexible coupling device 11 decouples the two transmission shafts 8 and 10 separating the bending modes of two rotors comprising the shafts 8 and 10 and the components mounted on each shaft, and dynamically balancing each rotor.

The compression section 9 is mounted between two bearings 15, 16 on the second transmission shaft 10, and includes a low pressure 17 part and a high pressure 18 part including each a gas input 19, 20, a gas output 21, 22 and a compression section 23, 24.

The compression section 23 of the low pressure part 17 includes a first half-compression section 25 and the compression section 24 of the high pressure part 18 comprises a second half-compression section 26.

Each half-compression section comprises at least one compression wheel 27, 28.

The first and second half-compression sections 25, 26 are arranged so that during the rotation of the second transmission shaft 10, the thrust generated by the compression wheel 27 of the first half-compression sections 25 compensates for the thrust generated by the compression wheel 28 of the second half-compression section 26 ("back to back" arrangement).

A first balancing piston 29 may be arranged between the first and second half-compression sections 25 and 26 to compensate a differential pressure acting on the differential pressure acting on the compression wheels 27, 28 of the compression section 9.

The gas outlet 21 of the low part pressure 17 is couplet with the gas inlet 20 of the high pressure part 18 through a second heat exchanger 4 in order to cool the gas flowing from the low pressure part 17 to the high pressure part 18.

The low pressure part 17 is intended, in use, to compress a gas flowing at the inlet 19 and the high pressure part 18 is intended to compress the gas compressed by the low pressure part 17.

An expander 30 is cantilevered at a free end of the second transmission shaft 10 and comprises a gas inlet 31 connected to the gas outlet 22 of the high pressure part 18 through the third heat exchanger 5 cooling the gas flowing from the high pressure part 18 to the expander 30.

The expander 30 is intended to expand the compressed gas flowing on the gas inlet 31 so that the low-pressure exhaust gas at an expander gas outlet 32 is at a very low temperature, for example −165° C.

In operation, when the flexible coupling device 11 is damaged such that the two transmission shafts 8 and 10 are mechanically disconnected, the compressed gas is expanded in the expander 31 and the power generated by the gas expansion is recovered as compression work by the compressor section 9.

The second transmission shaft 10 stops. No overspeed control system is needed to protect the assembly 2 against overspeed damages.

The gas outlet 32 is connected to the gas inlet 19 of the low pressure part 17 through the heat exchanger 3, which cools the fluid FL by transferring heat from the fluid FL to the gas, which process increases the temperature of the gas.

For example, the heat exchangers 3, 4 and 5 comprise cross flow heat exchangers.

Also, the assembly 2 includes a gas diffuser 33 positioned between the expander 30 and a first radial bearing 16 of the second transmission shaft 10.

The first radial bearing 16 is the closest radial bearing to the expander 30.

The gas diffuser 33 is coupled with the gas inlet 20 of the high-pressure part 18 and diffuses a part of the gas flowing in the gas inlet 20.

The gas diffused (gas barrier) by the diffuser 33 is directed to the expander 30 and to the first radial bearing 16 of the second transmission shaft 10.

If the flexible coupling 11 fails, the expander 30 will continue to drive the compression section 9 until the second transmission shaft 10 stops rotating, so that the compression section 9 still delivers a gas barrier.

This gas barrier prevents cooled expanded gas from damaging components, such as bearings 13, 14, 15, 16 and/or an electric motor 6 that are located within the housing 12.

A first duct 34 is coupled with on the one hand between the gas diffuser 33 and the first radial bearing 16, and on the other hand to the gas inlet 19 of the low pressure part 17, namely upstream the low pressure part, considering the gas flow in the motor-compressor to draw up a part of the diffused gas by the gas diffuser 33.

The connection of the first duct 34 to the gas inlet 19 generates a depression so that the gas barrier is aspired by the first duct 34 enhancing the efficiency of a thermal barrier generated by the gas barrier.

The assembly 2 may include a second balancing piston 35 positioned along the second transmission shaft 10 to compensate for a differential pressure acting on the expander 30. In such a case the expander 30 includes a second duct 36 between the second balancing piston 35 to the outlet 32 of the expander 30.

The second balancing piston 35 may include a third duct 37 cooperating with the second duct 36 to evacuate the gas barrier to the outlet 32 of the expander 30.

The pressure of the gas barrier is higher than the pressure of the low-pressure exhaust gas so that the gas barrier is aspired to the outlet 32 of the expander 30 avoiding more that the low-pressure exhaust gas migrates to the first radial bearing 16 and further inside the housing 12.

The high pressure part 18 may be mounted between the expander 30 and the low pressure part 17.

The pressure of the gas in the high pressure part 18 is higher than the low-pressure expanded gas avoiding even more that the low-pressure exhaust gas migrates to the first radial bearing 16 and further inside the housing 12.

The assembly further comprises a first thrust bearing 38 mounted on the first transmission shaft 8 and a second thrust bearing 39 mounted on the second transmission shaft 10, both thrust bearings comprising for example active magnetic bearings or gas bearings.

Each thrust bearing 38, 39 may include a first half-thrust bearing 40, 41 and a second half-thrust bearing 42, 43.

The first half-thrust bearing 40 and the second half-thrust bearing 42 of the first thrust bearing 38 are arranged at each side of the electric motor 6 to frame the radial bearings 13, 14 of the first transmission shaft 8.

The first half-thrust bearing 41 and the second half-thrust bearing 43 of the second thrust bearing 39 are arranged between the gas diffuser 33 and the flexible coupling 11 to frame the radial bearings 15, 16 of the second transmission shaft 10.

The first half-thrust bearings 40 and 41 compensate a thrust generated by the compression wheel 27, 28 of the compression section 9 on the first and second transmission shafts 8, 10 in a first axial direction X and the second half-thrust bearings 42, 43 compensate a thrust generated by the compression wheel 27, 28 of the compression section 9 on the first and second transmission shafts 8, 10 in a second axial direction Y opposite to the first axial direction X.

As the both thrust bearing 38, 29 comprising each the first half-thrust bearing 40, 41 and the second half-thrust bearing 42, 43 are identical, only the architecture of the first thrust bearing 38 is described below.

It is assumed that the first thrust bearing 38 comprises a magnetic bearing.

Each magnetic half-thrust bearing 40, 41 comprises a shoulder 44, 45 in the first transmission shaft 8 and a coil 46, 47.

The coils 46, 47 may be annular coils.

The first coil 46 is located before and proximate the first shoulder 44; and the second coil 47 is located before and proximate the second shoulder 45.

The first transmission shaft 8 passes through the coils 46 and 47.

The dedicated disk mounted on a transmission shaft of an axial magnetic thrust bearing according to the prior art is suppressed and replaced by the shoulders 44, 45.

The suppression of the dedicated disk permits to save space on the transmissions shafts and thus to design shorter and more rigid transmission shafts 8, 10. As the transmission shafts 8, 10 are shorter as transmission shafts of the prior art, the frequencies of the bending modes of the first and second transmission shafts 8, 10 are higher that the range of rotational speeds of the electric motor 6.

Figure 2:
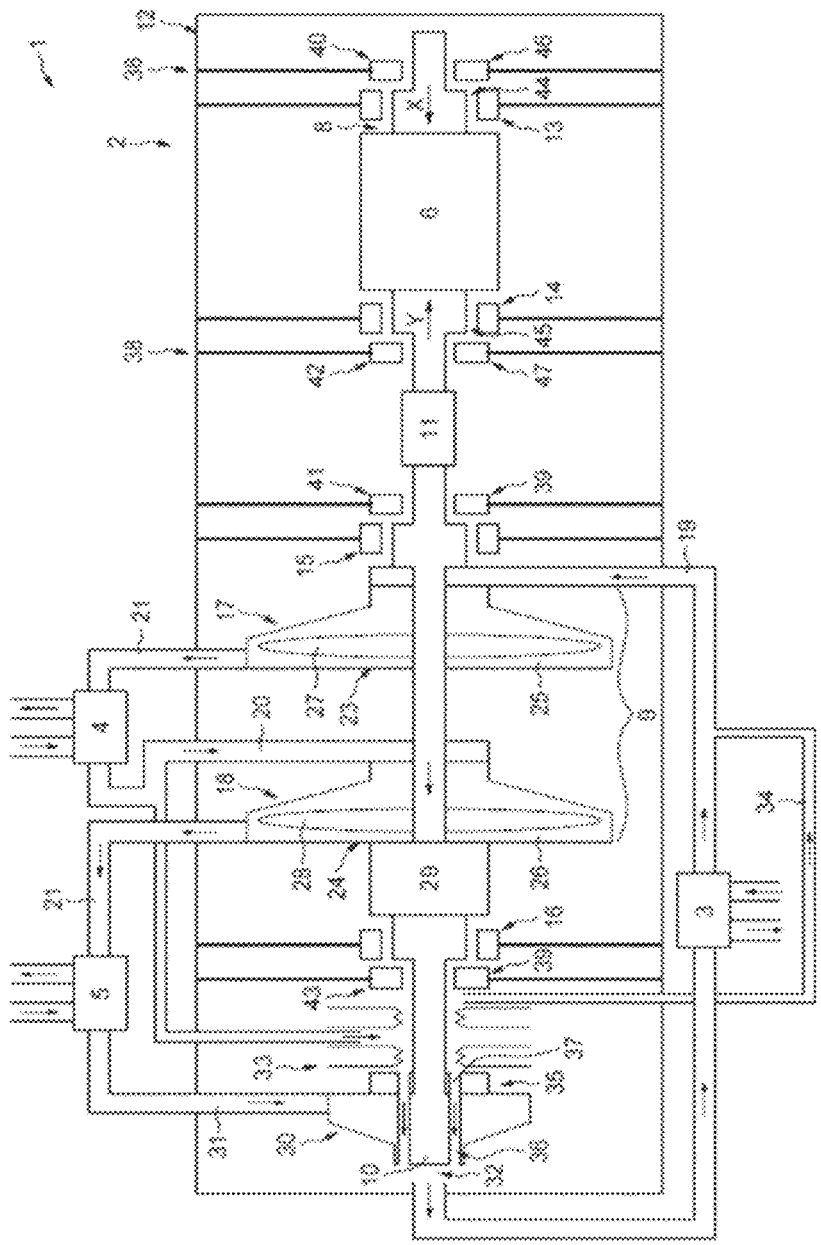
FIG. 2 illustrates a second embodiment of the integrated expander and motor-compressor assembly.

FIG. 2 illustrates a second embodiment of an integrated expander and motor-compressor assembly 2.

The second embodiment of the assembly 2 differs from the first embodiment of the assembly illustrated in FIG. 1 in that the first half-compression section 25 and the second half-compression section 26 of the compression section 9 are in series, and that the first balancing piston 29 lies between the gas diffuser 30 and the high pressure part 18.

According to another embodiment, the compression section 9 may comprise more than two half-compression sections in series.

In an embodiment of operation of the closed loop cooling circuit 1, the electric motor 6 drives the second transmission shaft 10. A process gas to be compressed is introduced via the gas input 19 of the low pressure part 17. The assembly 2 then compresses the process gas through the compression wheels 27 and 28 to thereby produce a compressed process gas cooled by the second and third heat exchanger 4 and 5. The cooled compressed process gas is then expanded in the expander 30.

The cooled expanded process gas flows in the first heat exchanger 3 and is heated by fluid FL.

The process gas flowing out the heat exchanger flows back to the inlet 19.

The cooling circuit 1 may be used in a liquified natural gas tanker (LNG), the gaseous natural gas FL flowing in the first heat exchanger 3 and liquefied natural gas flowing out the first heat exchanger.

Various inventive aspects of the invention are set forth in the following clauses, which may be combined in any suitable fashion unless otherwise indicated:

A. An integrated expander and motor-compressor assembly (2) comprising:
  one housing (12);
  at least two transmission shafts (8, 10), each supported in the housing by at least two radial bearings (13, 14, 15, 16);
  a flexible coupling device (11) connecting the transmission shafts;
  an electric motor (6) mounted on a first transmission shaft;
  an expander (30) cantilevered at a free end of a second transmission shaft; and
  at least one compression section (9) mounted between the two radial bearings (15, 16) on the second transmission shaft and having a high pressure part (18) and a low pressure part (17) fluidly coupled to the high pressure part so that a gas coming out of the low pressure part is compressed in the high pressure part,
  the integrated expander and motor-compressor assembly comprises:
  a gas diffuser (33) positioned between the expander and a first radial bearing (16) of the second transmission shaft, the first bearing being the closest bearing to the expander, and
  a first duct (34) connected between the gas diffuser and the first radial bearing and connected to an inlet (19) of the low pressure part,
  wherein the gas diffuser is configured to diffuse gas directed to the expander and to the first radial bearing (16),
  wherein the gas diffuser is configured to be fed with a part of the gas entering the high pressure part,
  wherein the first duct being configured to draw up a part of the diffused gas.

B. Expander and motor-compressor assembly according to A, wherein the high pressure part (18) is mounted between the expander (30) and the low pressure part (17) on the second transmission shaft (10).

C. Expander and motor-compressor assembly according to A or B, wherein the at least one compression section (9) comprises at least one compression wheel (27, 28) and a second balancing piston (29) to compensate a differential pressure acting on the at least one compression wheel.

D. Expander and motor-compressor assembly according to A or B,
  wherein the at least one compression section (9) comprises two half-compression sections (25, 26) comprising each at least one compression wheel and arranged so that, during the rotation of the second transmission shaft (10), the thrust generated by the at least one compression wheel (27) of a first half-compression section (25) compensates for the thrust generated by the at least one compression wheel (28) of the second half-compression section (26), and
  wherein a second balancing piston (29) is arranged between the two half-compression sections to compensate a differential pressure acting on the at least one compression wheel of the first and second half-compression sections.

E. Expander and motor-compressor assembly according to any one of A, B, C or D, comprising at least two thrust bearings (38, 39), a first thrust bearing (38) of the at least two thrust bearings being mounted on the first transmission shaft (8) of the at least two transmission shafts and a second thrust bearing (39) of the at least two thrust bearings being mounted on the second transmission shaft (10) of the at least two transmission shafts.

F. Expander and motor-compressor assembly according to E, wherein the thrust bearings (38, 39) comprise active magnetic bearings or gas bearings.

G. Expander and motor-compressor assembly according to E or F, wherein each thrust bearing (38, 39) comprises:
  a first half-thrust bearing (40, 41) and a second half-thrust bearing (42, 43),
  wherein each of the first half-thrust bearing (40) and the second half-thrust bearing (42) of the first thrust bearing (38) are arranged at each side of the electric motor (6) to frame the radial bearings (13, 14) of the first transmission shaft (8); and
  wherein the first half-thrust bearing (41) and the second half-thrust bearing (43) of the second thrust bearing (39) are arranged between the gas diffuser (33) and the flexible coupling (11) to frame the radial bearings (15, 16) of the second transmission shaft (10),
  wherein the first half-thrust bearings are configured to compensate a thrust generated by at the least one compression wheel of the at least one compression section on the first and second transmission shafts in a first axial direction (X); and
  wherein the second half-thrust bearings are configured to compensate a thrust generated by the at least one compression wheel of the at least one compression section on the first and second transmission shafts in a second axial direction (Y) opposite to the first axial direction.

H. Expander and motor-compressor assembly according G, wherein each magnetic half-thrust bearing (40, 41, 42, 43) comprises:
  a shoulder (44, 45) in the first (8) or second transmission shaft; and
  a coil (46, 47) located before and proximate the shoulder;
  wherein the first or second transmission shaft passing through the coil.

I. Expander and motor-compressor assembly according to A, B, C, D, E, F, G or H comprising:
  a first balancing piston (35) positioned along the second transmission shaft (10) of the at least two transmission shaft and configured to compensate a differential pressure acting on the expander (30),
  wherein the expander comprises at least a second duct (36), and
  wherein the first balancing piston comprises at least a third duct (37),
  such that both ducts are configured to cooperate together to evacuate the diffused gas diffused by the gas diffuser to an outlet of the expander.

J. Closed loop cooling circuit (1) comprising an expander and motor-compressor assembly (2) according to A, B, C, D, E, F, G, H or I and at least three heat exchangers (3, 4, 5),
  wherein a first heat exchanger (4) of the at least three heat exchangers being is coupled with a gas outlet of the low pressure part (17) and the a gas inlet of the high pressure part (18),
  wherein a second heat exchanger (5) of the at least three heat exchangers is coupled with to a gas outlet of the high pressure part (18) and a gas inlet of the expander and
  wherein a third heat exchanger (3) of the at least three heat exchangers is coupled with a gas outlet of the expander and the gas inlet of the high pressure part, and
  wherein the first and second heat exchangers being are configured to cool the gas flowing through the first and second heat exchangers and the third heat exchanger being configured to heat the gas flowing through the third heat exchanger.

The invention claimed is:

1. An integrated expander and motor-compressor assembly comprising:
  one housing;
  at least two transmission shafts, each supported in the housing by at least two radial bearings;
  a flexible coupling device connecting the transmission shafts;
  an electric motor mounted on a first transmission shaft; an expander cantilevered at a free end of a second transmission shaft; and,
  at least one compression section mounted between the two radial bearings on the second transmission shaft and having a high pressure part and a low pressure part fluidly coupled to the high pressure part so that a gas coming out of the low pressure part is compressed in the high pressure part,
    wherein the integrated expander and motor-compressor assembly comprises:
    a gas diffuser positioned between the expander and a first radial bearing of the second transmission shaft, the first bearing being the closest bearing to the expander, and
    a first duct connected between the gas diffuser and the first radial bearing and connected to an inlet of the low pressure part,
    wherein the gas diffuser is configured to diffuse gas directed to the expander and to the first radial bearing,
    wherein the gas diffuser is configured to be fed with a part of the gas entering the high pressure part,
    wherein the first duct being configured to draw up a part of the diffused gas.

2. The expander and motor-compressor assembly according to claim 1, wherein the high pressure part is mounted between the expander and the low pressure part on the second the second transmission shaft.

3. The expander and motor-compressor assembly according claim 1, wherein the at least one compression section comprises at least one compression wheel and a second balancing piston to compensate a differential pressure acting on the at least one compression wheel.

4. The expander and motor-compressor assembly according claim 1,
  wherein the at least one compression section (9) comprises two half-compression sections comprising each at least one compression wheel and arranged so that, during the rotation of the second transmission shaft, the thrust generated by the at least one compression wheel of a first half-compression section compensates for the thrust generated by the at least one compression wheel of the second half-compression section, and
  wherein a second balancing piston is arranged between the two half-compression sections to compensate a differential pressure acting on the at least one compression wheel of the first and second half-compression sections.

5. The expander and motor-compressor assembly according to claim 1, comprising at least two thrust bearings, a first thrust bearing of the at least two thrust bearings being mounted on the first transmission shaft of the at least two transmission shafts and a second thrust bearing of the at least two thrust bearings being mounted on the second transmission shaft of the at least two transmission shafts.

6. The expander and motor-compressor assembly according to claim 5, wherein the thrust bearings comprise active magnetic bearings or gas bearings.

7. The expander and motor-compressor assembly according to claim 5, wherein each thrust bearing comprises:
  a first half-thrust bearing and a second half-thrust bearing,
  wherein each of the first half-thrust bearing and the second half-thrust bearing of the first thrust bearing are arranged at each side of the electric motor to frame the radial bearings of the first transmission shaft; and
  wherein the first half-thrust bearing and the second half-thrust bearing of the second thrust bearing are arranged between the gas diffuser and the flexible coupling to frame the radial bearings of the second transmission shaft,
    wherein the first half-thrust bearings are configured to compensate a thrust generated by at the least one compression wheel of the at least one compression section on the first and second transmission shafts in a first axial direction; and,
    wherein the second half-thrust bearings are configured to compensate a thrust generated by the at least one compression wheel of the at least one compression section on the first and second transmission shafts in a second axial direction opposite to the first axial direction.

8. The expander and motor-compressor assembly according to claim 7, wherein each magnetic half-thrust bearing comprises:
  a shoulder in the first or second transmission shaft; and, a coil located before and proximate the shoulder;

wherein to the first or second transmission shaft passes through the coil.

9. The expander and motor-compressor assembly according to claim 1 comprising:

a first balancing piston positioned along the second transmission shaft of the at least two transmission shaft and configured to compensate a differential pressure acting on the expander, wherein the expander comprises at least a second duct, and wherein the first balancing piston comprises at least a third duct, such that both ducts are configured to cooperate together to evacuate the gas diffused by the gas diffuser to an outlet of the expander.

10. A closed loop cooling circuit comprising the expander and motor-compressor assembly according to claim 1 and at least three heat exchangers, wherein a first heat exchanger of the at least three heat exchangers is coupled with a gas outlet of the low pressure part and a gas inlet of the high pressure part, wherein a second heat exchanger of the at least three heat exchangers is coupled with a gas outlet of the high pressure part and a gas inlet of the expander, and wherein a third heat exchanger of the at least three heat exchangers is coupled with a gas outlet of the expander and the gas inlet of the high pressure part, and wherein the first and second heat exchangers are configured to cool the gas flowing through the first and second heat exchangers and the third heat exchanger is configured to heat the gas flowing through the third heat exchanger.

* * * * *